United States Patent [19]

Cooper

[11] Patent Number: 5,308,045
[45] Date of Patent: May 3, 1994

[54] SCRAP MELTER IMPELLER

[76] Inventor: Paul V. Cooper, 8389 Sherman Rd., Chesterland, Ohio 44026

[21] Appl. No.: 939,482

[22] Filed: Sep. 4, 1992

[51] Int. Cl.⁵ .............................................. C22B 9/00
[52] U.S. Cl. .................................. 266/235; 266/901; 366/325; 416/244 R; 416/237; 416/243; 464/182
[58] Field of Search ............... 266/235, 901; 75/708, 75/687; 65/178; 366/325, 328, 331; 464/182; 416/204, 244 R, 235, 237, 243

[56] References Cited

U.S. PATENT DOCUMENTS

| | | |
|---|---|---|
| 3,873,305 | 3/1975 | Claxton et al. |
| 3,984,234 | 10/1976 | Claxton et al. |
| 3,997,336 | 12/1976 | van Linden et al. |
| 4,128,415 | 12/1978 | van Linden et al. |
| 4,322,245 | 3/1982 | Claxton |
| 4,598,899 | 7/1986 | Cooper |
| 4,802,656 | 2/1989 | Hudault et al. |
| 4,884,786 | 12/1989 | Gillespie |
| 4,898,367 | 2/1990 | Cooper |
| 4,930,986 | 6/1990 | Cooper |
| 4,940,214 | 7/1990 | Gillespie |
| 4,954,167 | 9/1990 | Cooper ........................ 75/708 |
| 5,028,211 | 7/1991 | Mordue et al. ........... 416/204 R |
| 5,143,357 | 9/1992 | Gilbert et al. |

FOREIGN PATENT DOCUMENTS 530057 11/1976 U.S.S.R. .............................. 266/235

Primary Examiner—Melvyn J. Andrews
Attorney, Agent, or Firm—Nikaido, Marmelstein, Murray & Oram

[57] ABSTRACT

A scrap melter apparatus which includes a drive motor disposed above a molten metal bath, and a shaft attached to a bottom of the drive motor, and protrudes partway into the molten metal bath. A scrap melter impeller is attached to the bottom of the shaft. The impeller is a rectangular block of refractory metal, having a flat upper surface and a formed lower surface. The formed lower surface includes a first area disposed in a central portion of the metal block which has an even thickness from a first side of the impeller to a second side of the impeller. A second area is adjacent to the first area, and is tapered from a thin section at the first side of the metal block to a thick section at the second side of the metal block. The thickness of the second area at the second side corresponds to the thickness of the central area. A third area is adjacent to and on an opposite side of the first area from the second area. The third area tapers from a thick section at the first side of the impeller where a thickness corresponds to the thickness of the central area, to a thin section at the second side of the impeller.

17 Claims, 5 Drawing Sheets

SCRAP MELTER IMPELLER

BACKGROUND OF THE INVENTION

1. Field of the Invention

The present invention is directed to the field of circulating molten metals in a molten metal bath, and specifically to melting and circulating metal scrap being added to a molten metal bath. Due to the high temperatures required for melting metal scrap, the impeller is intended for extremely high heat applications.

2. Description of the Prior Art

Limitations in natural resources, and concerns for reducing environmental pollution, have caused significant growth in the metal recycling industry, also known as the secondary metal industry. The secondary metal industry collects metal scrap, such as aluminum, and remelts the scrap metal to create usable recycled metal. During the remelting process, oxides and gases are generated which can become entrained in the molten metal bath, and render some of the recycled metal as unusable. In order to minimize the effect of these oxides or gases, a flux is added to the surface of the bath, which causes impurities in the molten metal to rise to the surface, and create a crust or "dross", on the surface of the bath. A more complete discussion on the formation and treatment of this "dross" exists in U.S. Pat. No. 4,598,899, which is hereby incorporated by reference.

It is known that the utilization of molten metal pumps is extremely helpful in circulating the molten metal within the bath, to ensure that the temperature of the bath remains constant throughout, and to ensure that unmelted pieces of metal are circulated into the bath, so that they melt and mix therewithin.

Due to the high surface tension which is characteristic of molten metals, it is somewhat difficult to force lighter gauge metal scrap to circulate and melt within the metals. On the contrary, heavier scrap sinks to the bottom where it melts due to the high temperature therein. Therefore, applications where lighter metal scrap are melted are in need of these types of devices. Due to the highly corrosive and destructive environment that such impellers are intended to be used, these devices are typically made from graphite or other refractory materials which are sufficient to resist the harmful effects of this environment.

U.S. Pat. No. 4,598,899, discloses one type of melter for this application. This device utilizes a circular blade or auger made up of a plurality of blades formed as a spiral flute, wherein the auger forms a cylindrical shape. A cylindrical auger drum is attached to the outside of the auger, and cemented thereto, forming an auger assembly. The auger assembly is attached to the bottom of a rotating shaft, and projects into a molten metal bath. The shaft is rotated by an external motor, and acts to pull the molten metal down from a top side of the auger and push it downward; a secondary circulating pump is used to direct the output of the auger and form an overall internal convection path between baffles in the molten metal bath.

Certain shortcomings exist in this design. Because of the need for a two-piece auger assembly, manufacturing and assembling costs are significantly increased. Additionally, due to the thin spiral shape of the blades, damage and deterioration can occur as a result of the blades hitting unmelted metal. A further disadvantage is that the auger drum assembly can become clogged with debris, reducing or eliminating efficiency.

U.S. Pat. No. 4,898,367, which is hereby incorporated by reference, discloses a method of dispersing gas into molten metal, wherein a graphite shaft has an "impeller" on the end. The shaft is hollow, such that gas can be injected through the tube, and into the metal bath. The impeller at the end of the shaft is a simple square shape; as the shaft rotates, large bubbles exiting through the discharge opening in the bottle of the shaft will flow outwardly along the bottom face of the impeller, and contact the sharp corners of the rectangular impeller. The bubbles are therefore sheared into finally divided bubbles, and thrown outwardly and mixed with the molten metal. There is no teaching, however, of the impeller having any shape which would result in a significant movement or circulation of the molten metal.

SUMMARY OF THE INVENTION

The invention is intended to provide a simple, durable scrap melter impeller for a molten metal bath, which adequately circulates the molten metal, in such a way where light metal scrap is drawn from the surface into the bath. Simple one piece construction, and avoidance of unnecessarily thin or weak areas result in a device which is easier to manufacture and more durable than known impellers.

A scrap melter impeller according to the claimed invention includes a substantially square block of refractory material, having a flat upper surface and a formed lower surface. The formed lower surface includes a first area disposed in a central portion of the block. The first area has an even thickness from a first side of the impeller to a second side of the impeller. A second area is adjacent to the first area, and is tapered from a thin portion at the first side of the block to a thick portion at the second side of the block. The thickness at the second side corresponds to the thickness of the central area. A third area is adjacent to and on an opposite side of the first area from the second area. The third area tapers from a thick portion at the first side of the impeller where a thickness corresponds to the thickness of the central area, to a thin section at the second side of the impeller.

The invention also includes a scrap melter apparatus, having a drive means disposed above a molten metal bath, and a shaft means attached to a bottom section of the drive means. The shaft means protrudes partway into the molten metal bath. A scrap melter impeller, as described above, is fixedly attached to a bottom portion of the shaft. The molten metal bath may be in an open well attached to a furnace or other heat source.

The invention also teaches novel means for connecting the drive means to the shaft, which results in a stable axial connection between the drive means and the shaft, and allow the drive means and the shaft to be connected and disconnected while the drive means remains in position. The drive means typically includes a rotating member such as a concentric steel drive shaft.

BRIEF DESCRIPTION OF THE DRAWINGS

The above and other objects, and the attendant advantages of the present invention, will become readily apparent by reference by the following detailed description when considered in conjunction with the accompanying drawings, wherein.

DESCRIPTION OF THE PREFERRED EMBODIMENTS

Figure 1:
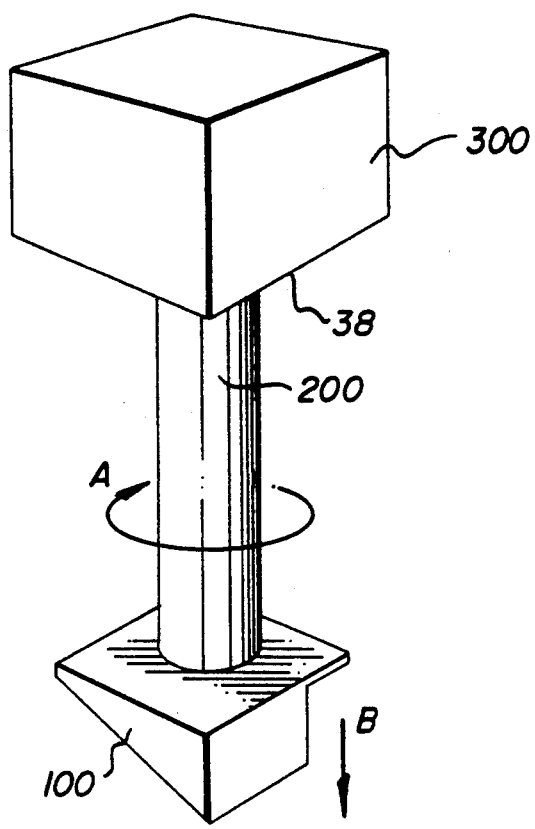
FIG. 1 is an overall view of the impeller, the shaft, and an upper support.

FIG. 1 shows impeller 100 attached to a bottom portion of shaft 200, which is in turn attached to a motor or drive means 300. The motor or drive means is suspended above a molten metal bath by a suspending means, which is not illustrated. Shaft 200 rotates in the direction of arrow A.

Figure 2:
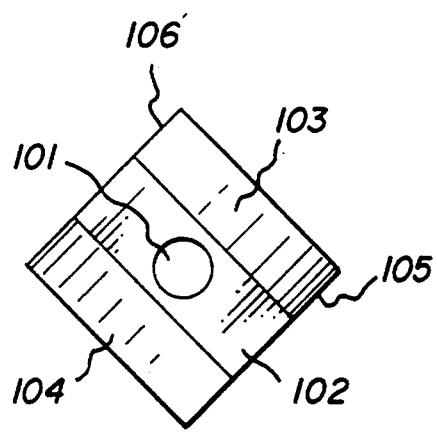
FIG. 2 is a bottom view of the impeller.
Figure 3:
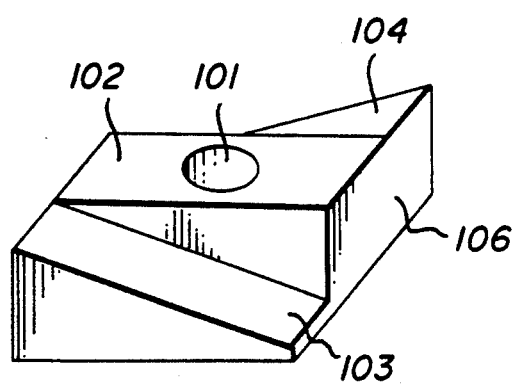
FIG. 3 is an angular bottom view of the impeller.
Figure 4:
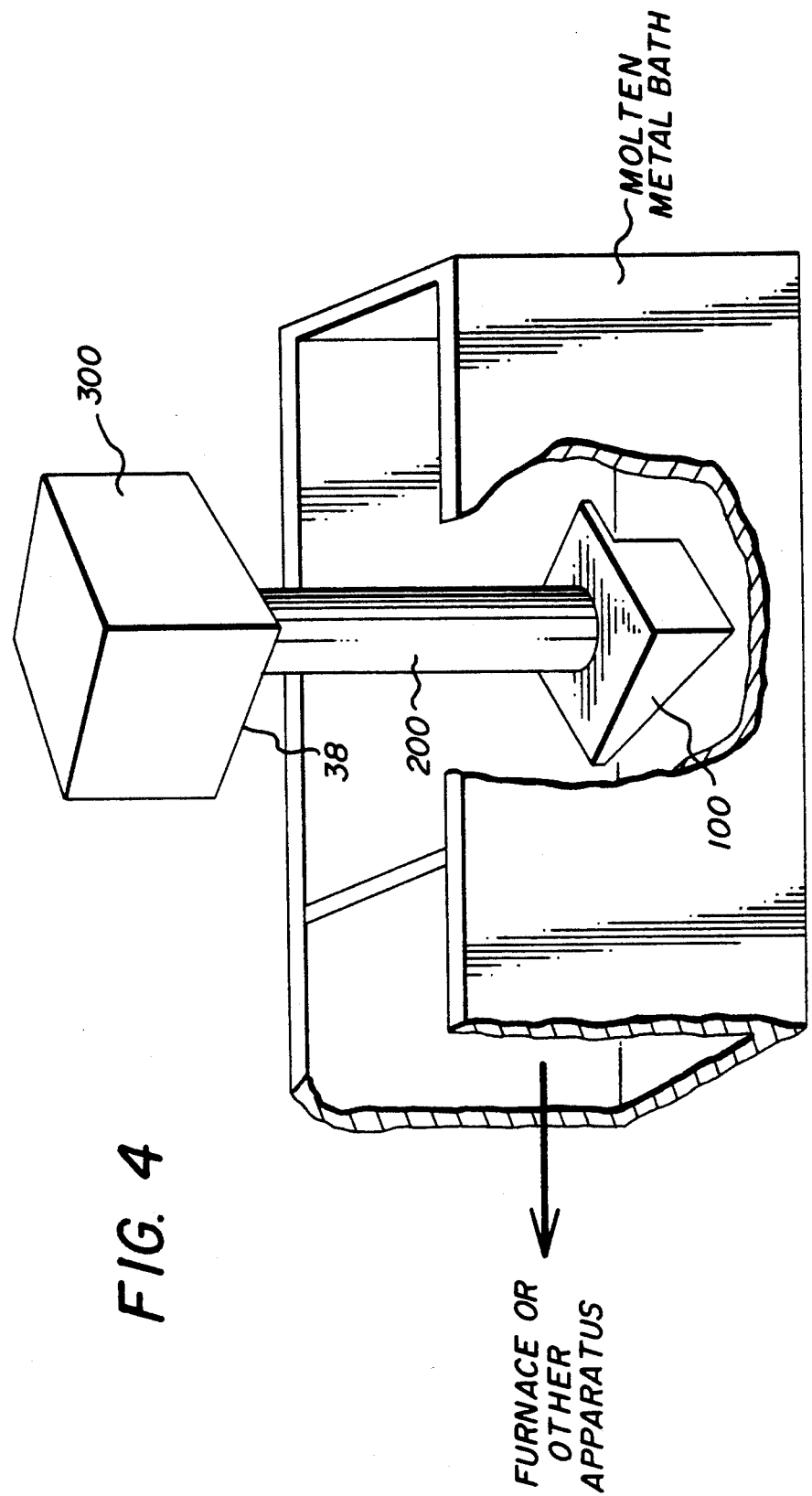
FIG. 4 illustrates a partial cut-away view of an open well having a molten metal bath therein, with the present invention place therein.

Referring to FIGS. 2 and 3, in conjunction with FIG. 1, it can be seen that impeller 100 has a substantially flat upper surface, with a threaded aperture 101 at a center portion thereof. The bottom side or surface of the impeller is divided into substantially three areas: a first or central area 102 which is of a constant thickness; a second area which is a side section which is tapered from thin portion at a first side 105 of the impeller to a thick portion at a second side 106 of the impeller; and a third area which is a side portion which tapers from a thin portion on side 106 of the impeller to a thick end on side 105 of the impeller. As can be seen in the drawings, essentially all of the planar surfaces of the impeller are flat and linear. The impeller 100 and the shaft 200 are formed of a material such as a graphite, or other refractory material suitable for high heat, high stress locations such as molten metal baths. The particular size of the impeller will depend upon the desired application. In one embodiment, the impeller may be of a square shape being, for example, 14×14×6 in. In another embodiment, the impeller may be 15×6×6 in.

Shaft 200 is disposed in aperture 101, and can be attached by threads located at a bottom portion of the aperture, threads which are disposed all the way through the aperture, or through other fastening means. A top portion of the aperture may be tapered or flared outward, to accommodate a correspondingly tapered end of the shaft.

In operation, impeller 100 is immersed into a molten metal bath, such that a portion of shaft 200 is below the surface of the molten metal bath, and an upper portion of shaft 200 is above the molten metal surface; rotary device 300 is above the molten metal bath, suspended by a suspending device (not shown). As the rotating means rotates the shaft in direction A, impeller 100 rotates in direction A. Due to the direction of the tapered surfaces 103 and 104 of impeller 100, molten metal is pushed axially downward, in the direction of arrow B. The thicker ends of the blades push molten metal radially outward. The high pressure being created below the impeller results in low pressure on the upper part of the impeller. Molten metal from above the impeller is thereby drawn downward, creating a circulation path. Materials in the form of unmelted metal scrap and other material from the surface of the bath is drawn downward, and properly circulated therein.

The impeller can be attached to shaft 200 by threading, adhering, or other fastening means which are acceptable for the high stress environment of a molten metal bath.

Figure 5:
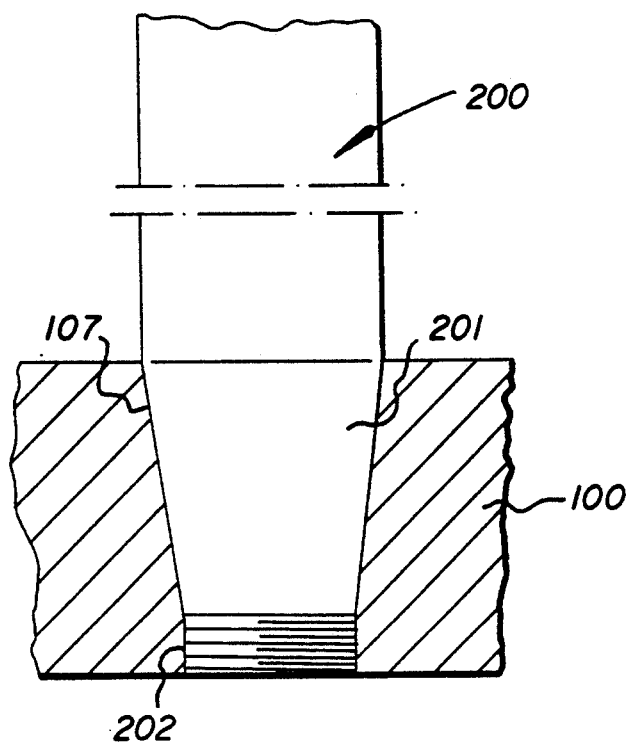
FIG. 5 illustrates one embodiment of the connection between the impeller and the shaft of the present invention.

As shown in FIG. 5, one embodiment of the invention utilizes a tapered portion 201 of shaft 200, which fits into a correspondingly tapered section 107 of impeller 101. Threads 202 engage a correspondingly threaded portion of the impeller, thereby surely and firmly securing the impeller to the shaft. The tapered surfaces allow for easy centering of the shaft in the aperture. With this configuration, the threads do not actually transmit or carry any torque. The threads are used to frictionally engage the tapered faces of the aperture to the correspondingly tapered faces of the shaft. The tapered faces actually bear the torque, while the threads merely keep the tapered faces engaged.

Figure 6:
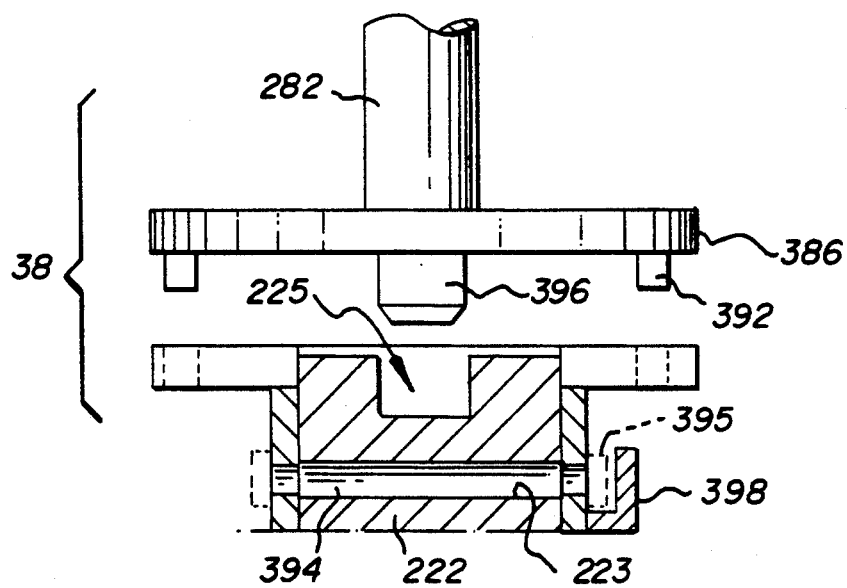
FIGS. 6-9 show an embodiment of the shaft being connected to the drive means, according to the present invention.
Figure 7:
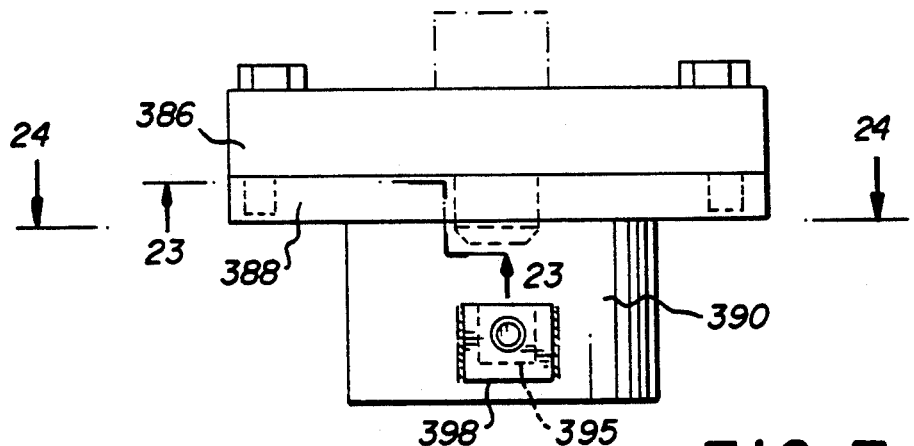
Figure 8:
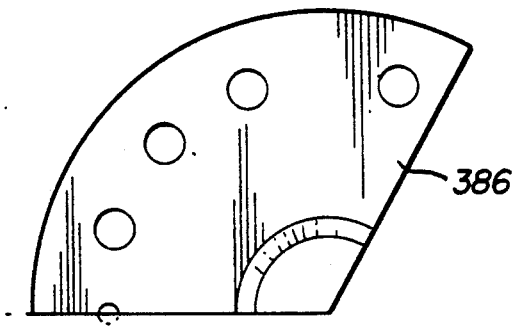
Figure 9:
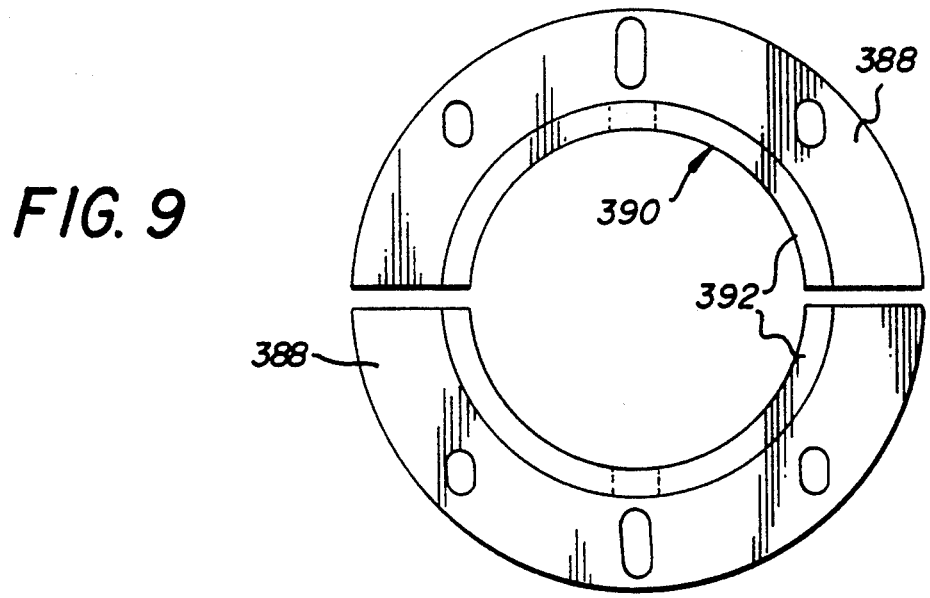

Typically, motors or drive means used in these types of applications have a concentric steel shaft extending downward therefrom. The graphite or refractory shaft of the impeller must be securely axially affixed to this shaft. It is possible to attach the concentric steel shaft to the graphite shaft by threading. The following is a description of a non-threaded connecting system, which is part of the melter apparatus of the invention. Referring to FIGS. 6-9, connecting device 38 is used for vertically or axially coupling motor shaft 282 to pump shaft 200. The end of pump shaft 200 has a concentric location bore 225 therein, for receiving a center cylinder of a pilot flange, as shown in FIG. 6 and discussed below. Split coupling 390 is provided to the pump shaft and includes two half flanges 388, each having a depending half cylindrical member 392 attached thereto. Bolt 394 extends through a diametrical bore 223, provided in the end of the pump shaft. A pair of through bolt holes in the depending half cylindrical members 392, positioned such that the upper faces of the flanges 388 of the split coupling are substantially aligned with the upper end of the pump shaft. A clip-type nut holder 398 is provided on the outer surface of one of the depending flanges, adjacent to one of the bolt holes to hold the nut 395 attached to the bolt 394. This bolt enables simple assembly of the coupling to the shaft. A pilot flange 386 is attached to the motor shaft 282, and the half flanges 388 of the split coupling 390 (FIG. 7). The pilot flange 386 has a center cylinder 396 extending coaxial therefrom sized to match and be received in the concentric locating bore 225 of the pump shaft 200. The flange portion of the pilot flange 386 has tapped holes for each half flange of the split coupling to be mounted to the pilot flange. Appropriately sized shoulder bolts are threadingly engaged in the tapped holes, and join the half flanges of the split coupling and to the co-axial flange of the flexible coupling unit to the pilot flange. Pins 392 may be fitted into matching bores in the pilot flange and the half flanges to complement the shear strength of the bolts.

Figure 10:
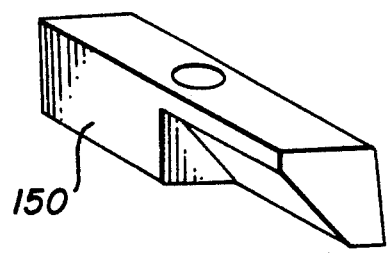
FIGS. 10 and 11 show a second embodiment of an impeller according to the present invention.
Figure 11:
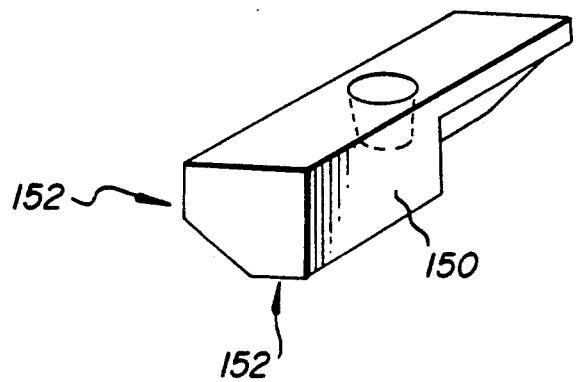

FIGS. 10 and 11 show a second embodiment of the impeller, wherein the impeller has a length which is substantially greater than a width, providing a more rectangular shape. All of the elements from the first embodiment are applicable to this second embodiment. A possible size for the impeller of FIGS. 10 and 11 would be 6 inches wide by 6 inches thick by 15 inches long.

Figure 12:
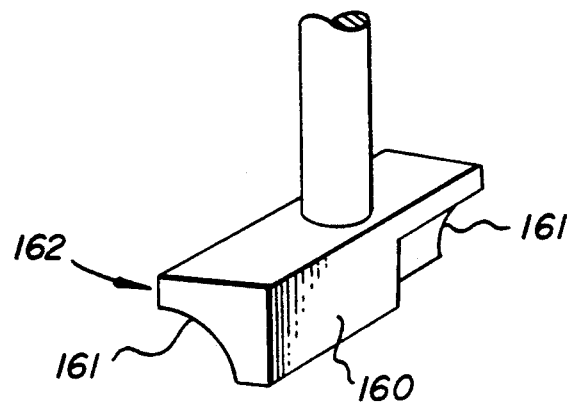
FIG. 12 shows a third embodiment of an impeller.

FIG. 12 shows a third embodiment of the invention, wherein the second and third areas have curved surfaces connecting the thin portion to the thick portions. These curved surfaces can also be used in the first and the second embodiments.

Also note that there is no requirement that the tapers extend all the way from the first side to the second side. As shown in FIGS. 10–12, non-tapered portions 152 and 162 may be included with the impeller.

As discussed earlier, it can be seen that the impeller of the claimed invention has substantially heavy, thick surfaces which would are resistant to being damaged by unmelted metals or hard objects in the molten metal bath. Additionally, no auger drum or other pieces are required to improve the circulation characteristics of the impeller. The invention is virtually impossible to clog. Therefore, the invention results in a significant improvement over impellers which are known in the art.

As evident from FIG. 3, the surface area of each of tapered portions 104 and 103 is approximately 30% of the overall surface area of the bottom portion of the impeller. However, this surface area may be varied, as can the angle of taper of the tapered portions, as necessary for particular applications.

It is readily apparent that the above-described invention has the advantage of wide commercial utility. It should be understood that the specific form of the invention described above is intended to be representative only, as certain modifications within the scope of these teachings will be apparent to those skilled in the art.

Accordingly, reference should be made to the following claims in determining the full scope of the invention.

What is claimed is:

1. A scrap melter impeller to be submerged into a molten metal bath, comprising:
    a rectangular block of refractory material, said block having a flat upper surface and a formed lower surface, wherein said formed lower surface includes:
        a first section disposed in a central portion of said block, said first section having an even thickness from a first side of the impeller to a second side of the impeller;
        a second section adjacent to said first section, said second section being tapered from a thin section at the first side of said metal block to a thick section at the second side of the block, said thickness of said second section at said second side corresponding to the thickness of said central portion; and said formed lower surface also includes
        a third section adjacent to and on an opposite side of said first section from said second section, said third section tapering from a thick section at the first side of the impeller where a thickness of said third section corresponds to the thickness of the central portion, to a thin section at the second side of the impeller.

2. A scrap melter impeller as recited in claim 1, wherein an outer surface of the first side of the impeller includes a thick section which corresponds to the thickness of the first section and the thick section of the third section, and a thin section which corresponds to the thin section of the second section of the block.

3. A scrap melter impeller as recited in claim 1, wherein said first section includes an aperture disposed in a middle part thereof, said aperture having threads at a bottom portion thereof.

4. A scrap melter impeller as recited in claim 3, wherein said aperture includes an upper portion which tapers outward from the bottom portion, to accommodate a correspondingly tapered shaft therein.

5. A scrap melter impeller as recited in claim 1, wherein an outer surface of a third side of the impeller has a trapezoidal shape within a substantially horizontal upper surface, and an angled lower surface which linearly tapers from one of said thin sections to one of said thick sections.

6. A scrap melter apparatus, comprising:
    a drive means disposed above a molten metal tank;
    a shaft means attached to a bottom section of said drive means, and protruding partway into said molten metal tank; and
    a scrap melter impeller fixedly attached to a bottom portion of said shaft, said impeller comprising
        a rectangular block of refractory material, said block having a flat upper surface and a formed lower surface, wherein said formed lower surface includes a first section disposed in a central portion of said block, said first section having an even thickness from a first side of the impeller to a second side of the impeller;
        a second section adjacent to said first section, said second section being tapered from a thin section at the first side of said block to a thick section at the second side of the block, said thickness of the second section at said second side corresponding to the thickness of said central portion; and
        a third section adjacent to and on an opposite side of said first section from said second section, said third section tapering from a thick section at the first side of the impeller where a thickness corresponds to the thickness of the central portion, to a thin section at the second side of the impeller.

7. A scrap melter apparatus as recited in claim 6, wherein an outer surface of the first side of the impeller includes a thick section which corresponds to the central section and the thick portion of the third section, and a thin section which corresponds to the thin section of the second section of the impeller.

8. A scrap melter apparatus as recited in claim 6, wherein said central portion includes an aperture disposed in a middle part thereof, said aperture having threads at a bottom portion thereof.

9. A scrap melter apparatus as recited in claim 8, wherein said aperture includes an upper portion which tapers outward from the bottom portion, to accommodate a correspondingly tapered shaft therein.

10. A scrap melter apparatus as recited in claim 6, wherein an outer surface of a third side of the impeller is of a trapezoidal shape having a substantially horizontal upper surface, and a planar lower surface which is angled from one of said thin portions to one of said thick portions.

11. A scrap melter apparatus, comprising:
    drive means disposed above a molten metal tank, said drive means having a rotating member at a bottom portion thereof;
    connecting means attached to said drive means;
    shaft means attached to said connecting means, said shaft means having an upper end and a lower end thereof and protruding partway into said molten metal tank;

a scrap melter impeller fixedly attached to the lower end of said shaft means;

wherein said connecting means comprises a connecting unit attached to said rotating member and having a pilot flange, with the upper end of said shaft means having a concentric locating bore therein, a split coupling provided on the upper end of the shaft means and including two half flanges each having a depending half cylindrical member attached thereto, a bolt extending through a diametrical through bolt hold provided in the shaft means and a pair of bolt holes in said depending half cylindrical members positioned such that upper faces of the half flanges of the split coupling are substantially aligned with the upper end of the shaft means, said pilot flange having a center cylinder extending coaxially therefrom sized to match and be received in the concentric locating bore of the shaft, said pilot flange having tapped holes for each half flange of the split coupling to be mounted to the pilot flange, appropriately sized shoulder bolts threadingly engaged in said tapped holes and joining said half flanges of said split coupling to said pilot flange, said half flanges and said pilot complementing the shear strength of the bolts.

12. A scrap melter apparatus as recited in claim 11, said coupling means further comprising a nut holder provided on an outside surface of one of the depending flanges adjacent one of said bolt holes to hold a nut attached to the bolt without use of a separate tool, whereby assembly of the coupling to the shaft is enabled even with the coupling being inside of a superstructure assembly.

13. A scrap melter impeller as recited in claim 1, wherein a top surface of said impeller has a square shape.

14. A scrap melter impeller as recited in claim 1, wherein a top surface of said impeller has a length which exceeds a width thereof.

15. A scrap melter impeller as recited in claim 1, wherein said second section tapering from a thin section to a thick section comprises a curved surface from said thin section to said thick section, and said third section includes a curved surface tapering from said thick section to said thin section.

16. A scrap melter impeller as recited in claim 15, wherein said curved surfaces are concave.

17. A scrap melter apparatus as recited in claim 11, further comprising pins formed on a bottom surface of said pilot flange, said pins fitting into matching bores in said half flanges, thereby complementing the shear strength of the bolts.

* * * * *